United States Patent Office 3,400,356
Patented Sept. 3, 1968

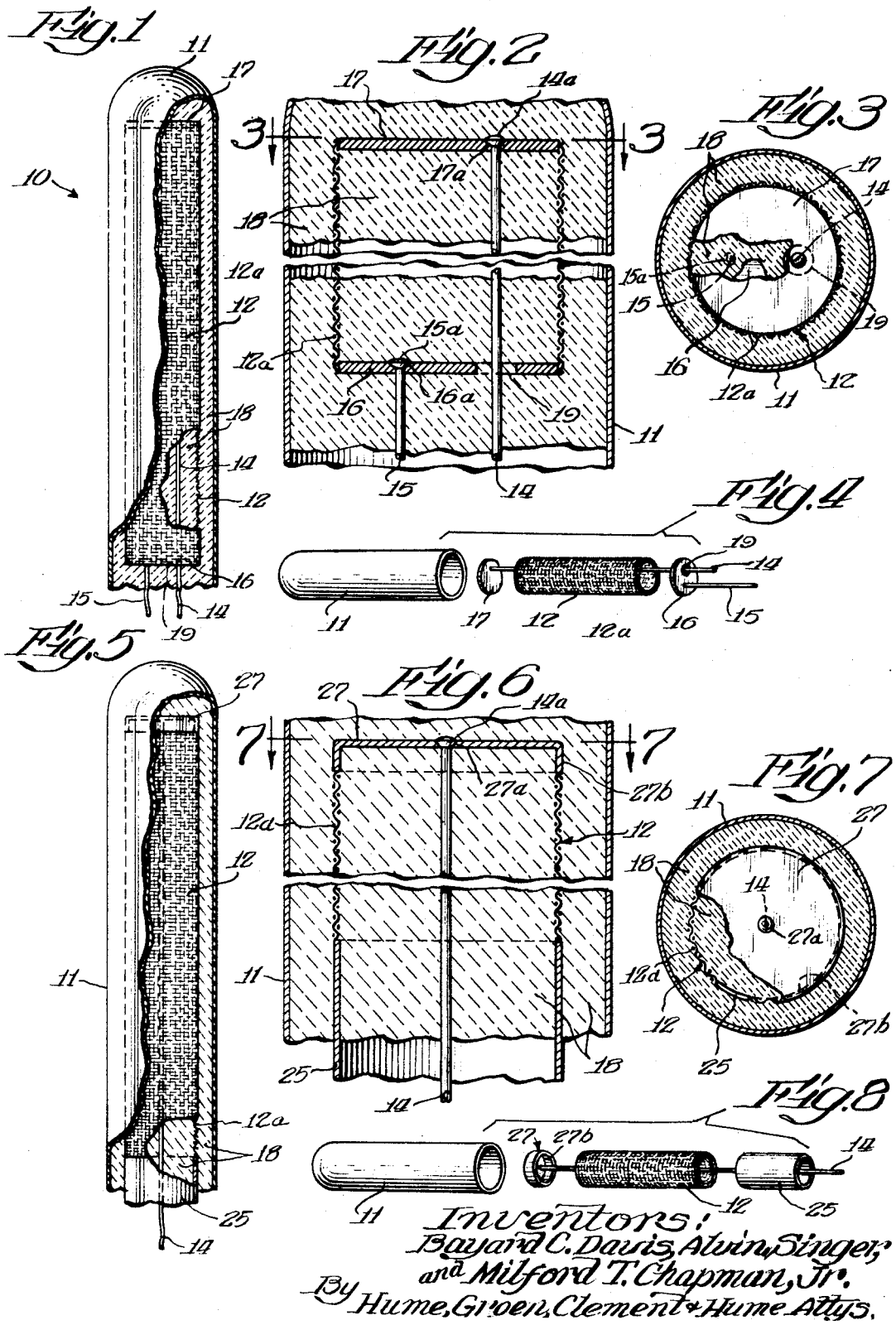

3,400,356
SCREEN HEATER WITH AN OUTER
METALLIC SHEATH
Bayard C. Davis, 425 S. Grace St., Lombard, Ill. 60148; Alvin Singer, 1125 Hohrfelder Road, Glencoe, Ill. 60022; and Milford T. Chapman, Jr., 34 N. Grant Drive, Addison, Ill. 60101
Filed Nov. 16, 1965, Ser. No. 508,010
7 Claims. (Cl. 338—208)

ABSTRACT OF THE DISCLOSURE

An electric heater construction. An outer, protective metallic sheath is filled with a mass of heat-conductive, electrically insulating ceramic material. A cylindrical screen heater element is embedded in the ceramic material. The screen element comprises a plurality of resistive heating wires which are electrically interconnected in mesh fashion to provide numerous current paths. Conductive means are provided to connect the screen element to a source of electrical energy.

---

This invention pertains to heater constructions and, in particular, to an electric heater structure characterized by high and uniform heat output.

Accordingly, it is an object of this invention to provide an electric heater capable of producing a very high seat yield per unit surface area.

Another object of this invention is to provide an electric heater having consistently uniform heat distribution characteristics.

An additional object of this invention is to provide an electric heater whose efficiency and heating capability and uniformity are substantially unimpaired by circuit discontinuities.

A further object of this invention is to provide an electric heater characterized by a minimum internal dissipation of thermal energy.

Still another object of this invention resides in the provision of a compact, yet strong and durable electric heater construction.

It is also an object of this invention to provide an electric heater characterized by a long useful life.

A fuller understanding and appreciation of the foregoing objects, as well as others, will be gained from a consideration of the following specification and claims, with particular reference to the drawing, in which:

FIGURE 1 is an elevational view of one embodiment of a heater construction fabricated in accordance with the invention, with various of the components partially broken away;

FIGURE 2 is an enlarged fragmentary sectional view of the embodiment shown in FIGURE 1;

FIGURE 3 is a cross-sectional view, partially broken away, taken on the line 3—3 of FIGURE 2;

FIGURE 4 is an exploded view of the embodiment depicted in FIGURE 1;

FIGURE 5 is a view similar to FIGURE 1, but depicting an alternative embodiment of the invention;

FIGURE 6 is a view similar to FIGURE 2, and illustrates the arrangement of components comprising the embodiment depicted in FIGURE 5;

FIGURE 7 is a cross-sectional view, partially broken away, taken on the line 7—7 of FIGURE 6; and FIGURE 8 is an exploded view of the embodiment depicted in FIGURE 5.

In general, the electric heater construction (hereinafter termed the "heater") which is the subject of this invention includes an outer cylindrical sheath which encloses a mass of electrically-insulating, heat-conducting material. Embedded within this mass of material and spaced from the inner surface of the sheath is a resistive heating element, also cylindrical in shape. The heating element is made up of a plurality of relatively fine resistive heating wires which are meshed to form a cylindrical screen structure. Attached to both ends of the cylindrical screen and in electrical contact with the individual resistive heating wires are a pair of electrically-conductive members, which are in turn connected to a suitable source of electrical energy.

Because the resistive heating element comprises a screen of tiny individual wires, there are multitudinous paths for current to follow. This results in a high yet extremely uniform heat output which is virtually uneffected by interruption of even several of the current paths due to breakage or other damage to the individual wires. In addition, the mass of material surrounding the components serves both as an electrical insulator and an insulator against mechanical stresses, and also provides an efficient means for transmitting the heat generated by the resistive heating element to the outer sheath, whence the heat is dissipated to the surrounding environment.

Referring now to the drawings, FIGURE 1 depicts one preferred embodiment of a heater 10 constructed in accordance with the invention. FIGURE 4, which is an exploded view of the heater 10, best shows the gross arrangement of the individual components. As seen therein, an outer sheath 11 is adapted to enclose a resistive heating element 12. A pair of disc-shaped terminal plates 16 and 17 are adapted to be connected to opposite ends of the heating element 12. A conductor 15 is connected to the terminal plate 16 and serves as a lead to a suitable source of electrical energy (not shown). A second conductor 14 is connected to the terminal plate 17 and passes through the interior of the heating element 12 and then through an aperture 19 in the terminal plate 16; the conductor 14 also serves as a lead to the electrical energy source.

Referring again to FIGURE 1, the outer sheath 11 surrounds and encloses the remaining components of the heater. The sheath 11 is preferably of a temperature-resistant metal (for example, stainless steel) and is preferably of a generally cylindrical shape with a closed end as shown in FIGURE 1. The thickness of the material used to form the sheath, as well as the outer diameter of the sheath itself, is dictated by a number of factors such as required strength and heat dissipation capability, and size limitations.

Enclosed within the sheath 11 and completely surrounding the remaining components is a mass of ceramic insulating material denoted by the numeral 18. The mass of material 18, which preferably comprises magnesium oxide or other suitable ceramic composition, serves a number of functions. Since the ceramic material 18 has a high dielectric strength, it provides excellent electrical insulation for the various components of the heater 10. It also serves to maintain the spaced relationship of the various components and helps to provide the necessary strength and rigidity for the entire heater. In addition, the ceramic material 18 is of course an extremely efficient heat conductor.

Disposed within the sheath 11 and embedded in the mass of ceramic material 18 is the cylindrical resistive heating element 12. The heating element 12 is made up of a plurality of relatively fine resistive heating wires 12a which are meshed to form a screen structure. The wires 12a can be formed from any one of a number of suitable resistive heating materials (e.g., Nichrome, Kanthal, etc.) and are of relatively small diameter, ranging preferably from about .010″ to about .0031″ or less, or from 30 to 40 A.W. gauge. The number and specific arrangement of the individual wires 12a are dictated by a number of factors, depending upon both the desired heating characteristics and the intended use of the heater.

The number of meshes per linear inch of the resistive element 12 is of course dependent upon a number of factors, such as the size and number of the wires 12a and the cylindrical diameter of the heating element; typically, the diameter of the screen might range from .100″ to .300″ and the number of meshes per linear inch might range from 40 x 40 to 100 x 100. It should be understood, however, that all of the dimensions and ranges mentioned herein are exemplary only, and may be varied within wide limits without impairing the utility of the invention.

The pair of spaced conductors 14 and 15 are disposed within the sheath 11. As best shown in FIGURE 2, the conductors 14 and 15 are respectively connected to conductive terminal plates 17 and 16 which are attached to opposite ends of the heating element 12. The conductors 14 and 15 and the terminal plates 16 and 17 may be of any suitable low resistance, electrically-conductive material, such as nickel or copper. As shown in FIGURE 2, each of the conductors 14 and 15 has a respective end portion 14a and 15a, designed to fit in a corresponding seat 17a and 16a in the terminal plates 17 and 16, respectively. The end portions 14a and 15a may be secured by a press fit into the seats 17a and 16a, or may be secured by riveting, welding, or the like. Indeed, the end portions 14a and 15a and the seats 17a and 16a may be dispensed with entirely; all that is required is that there be a secure mechanical and electrical connection between the conductors 14 and 15 and the terminal plates 17 and 16, respectively.

As seen in FIGURE 2, the terminal plate 16 has a suitable aperture 19 through which the conductor 14 passes. Thus there is no electrical contact between the conductor 14 and the terminal plate 16. The terminal plates 16 and 17 are electrically connected to opposite ends of the heating element 12. Again, this connection may be maintained by force fit, welding or other suitable means. All that is required is a firm electrical and mechanical connection. While the terminal plates 16 and 17 are shown as fitting snugly within the ends of the cylindrical heating element 12, this configuration can of course be varied. For example, the plates 16 and 17 can be fitted over the ends of the element 12 like caps, etc.

One typical method comprises constructing a partial subassembly of the components including the terminal plates, heating elements and conductors and joining these partially assembled components to a plurality of suitably apertured pellets of ceramic insulating material. When this subassembly is completed, it is inserted within the sheath which, to the extent necessary, may also be provided with a quantity of ceramic insulating material in granular form so as to ensure that the assembly is free of void spaces. With the completion of this assembling operation, the structure is then subjected to one or more swaging and/or drawing operations to ensure the compacting of the ceramic pellets and to thereby yield a mechanically stable structure that is free of any void spaces or other discontinuities. Alternatively, a partially assembled group of components can be subjected to repetitive dipping operations in a liquefied ceramic material so as to yield the build up of insulating layers within and around these components. Again in this instance, the final swaging and/or drawing operations are effected in a conventional manner.

The operation of the heater construction 10 may now be described. The conductors 14 and 15 are connected across a suitable source of supply voltage. Assuming current flow from the conductor 14 ultimately to the conductor 15, the current flows through the conductor 14 to the terminal plate 17, thence to the heating element 12, the terminal plate 16 and back to supply via the conductor 15. Since the terminal plates 16 and 17 make circumferential electrical contact with the cylindrical heating element 12, the current flow and thus the heating effect is evenly distributed among the individual wires 12a. The meshed screen structure of the heating element 12 provides a myriad of current paths.

Because of the large number of available current paths provided by the meshed screen configuration of the heating element 12, breaking or fusing of a particular mesh segment has little effect on the overall heating capability of the heater construction. Since the individual components are completely embedded in the mass of ceramic material 18, and then encased in the sheath 11, the heater construction is essentially impervious to the stresses and shocks normally encountered in practical applications. Moreover, the ceramic material 18 acts as a very efficient conductor of heat.

Referring now to FIGURES 5 through 8, there is shown another heater construction 20 constituting a second preferred embodiment of the invention. In the following description, components corresponding to those described above with reference to FIGURES 1 through 4 are designated by the same numerals.

As shown in FIGURE 5, a cylindrical electrical heating element 12, comprising a screen of fine resistive heating wires 12a, is disposed within a protective sheath 11. A mass of ceramic material 18 surrounds the individual components within the sheath 11 and serves to insulate and space them as with the previously described embodiment.

As best shown in FIGURE 6, a conductive terminal plate 27 is secured to one end of the heating element 12. The terminal plate 27 differs from the terminal plate 17 shown in FIGURE 2 in that the plate 27 has an annular flange 27b which mates with one end of the heating element 12. The flange 27b is preferably connected to the heating element 12 in the manner described above for the terminal plate 17 with reference to FIGURES 1 through 4.

A conductor 14 is disposed axially within the heating element 12 and is connected to the terminal plate 27. Again, although FIGURE 6 shows a conductor end portion 14a fitted into a seat 27a in the terminal plate 27, the only essential requirement is that there be a secure mechanical and electrical connection between the conductor 14 and the terminal plate 27.

Attached to the other end of the heating element 12 is an annular, low resistance conductive terminal member 25 which mates with and is connected to the heating element in generally the same manner as the terminal plate 27. The conductor 14 is disposed axially through the terminal member 25 as well as the heating element 12.

The operation of the heater construction 20 is identical to that of the heater construction 10, described above, except that the cylindrical terminal member 25 serves as the second current-conducting lead for connection to the electrical energy source. Thus current flows from the source (not shown), through the conductor 14 to the terminal plate 27, thence through the myriad fine wires 12a of the heating element 12 and back to supply through the terminal member 25.

It is possible, of course, to utilize the sheath 11 as a supply conductor in applications where such would be desirable and permissible. In such a case, the sheath 11 would be of a low resistance, highly-conductive metal and would obviate the need for one of the conductors 14 or 15 in the construction of FIGURES 1 through 4, or for either the conductor 14 or the member 25 in the construction of FIGURES 5 through 8. It would be necessary, of course, to establish electrical connection between the sheath 11 and the heating element 12.

A representative heater constructed according to the invention might have an outer sheath diameter of .250″ and a 31-wire heating element screen with 100 x 100 meshes per linear inch. When connected across a 115 volt supply source, a three-foot length of such a heater construction might be expected to uniformly yield in the neighborhood of 2,000 watts, or roughly 200 watts per square inch of sheath surface.

Although the invention has been described with the requisite particularity, it should be understood that the present disclosure is only exemplary. Consequently, numerous changes in the details of construction and the combination and arrangement of components will be apparent to those familiar with the art, and may be resorted to without departing from the scope of the invention as claimed.

What is claimed is:

1. An electric heater construction comprising: a cylindrical protective sheath; a mass of heat-conductive, electrically-insulating, ceramic material filling said sheath; a hollow cylindrical screen comprising a plurality of meshed resistive heating wires, said screen being embedded in said mass of ceramic material and being positioned essentially coaxially with respect to said sheath; and conductive means for connecting each end of said screen to a source of electrical energy.

2. An electric heater construction as defined in claim 1, wherein said conductive means comprise: a first conductive terminal plate attached to one end of said screen; a first conductor disposed within and spaced from the inner surface of said screen, and attached at one end to said first terminal plate, and adapted to be connected at its other end to a source of electrical energy; a second conductive terminal plate attached to the other end of said screen, and having an aperture through which said first conductor passes; and a second conductor attached at one end of said second terminal plate, and spaced from said first conductor and said sheath, and adapted to be connected at its other end to said source of electrical energy.

3. An electric heater construction as defined in claim 1, wherein said conductive means comprise: a conductive terminal plate attached to one end of said screen; a conductor disposed essentially coaxially within and spaced from the inner surface of said screen, and attached at one end to said terminal plate, and adapted to be connected at its other end to a source of electrical energy; and an annular conductive member attached to the other end of said screen and extending longitudinally essentially coaxially within said sheath, said annular conductive member being spaced from the inner surface of said sheath and being adapted for connection to said source of electrical energy.

4. An electric heater construction comprising: an outer metallic sheath; a mass of heat-conductive, electrically-insulating material confined in said sheath; a screen heater element embedded in said mass of material, said element comprising a plurality of resistive heating wires electrically interconnected in meshed fashion to form said screen; and conductive means for connecting said element to a source of electrical energy.

5. An electric heater construction as defined in claim 4, wherein said screen heater element has a cylindrical configuration.

6. An electric heater construction as defined in claim 5, wherein said conductive means comprise: a first conductive terminal plate attached to one end of said element; a first conductor disposed within and spaced from the inner surface of said element, and attached at one end to said first terminal plate, and adapted to be connected at its other end to a source of electrical energy; a second conductive terminal plate attached to the other end of said element; and having an aperture through which said first conductor passes; and a second conductor attached at one end of said second terminal plate, and spaced from said first conductor and said sheath, and adapted to be connected at its other end to said source of electrical energy.

7. An electric heater construction as defined in claim 5, wherein said conductive means comprise: a conductive terminal plate attached to one end of said element; a conductor disposed essentially coaxially within and spaced from the inner surface of said element, and attached at one end to said terminal plate, and adapted to be connected at its other end to a source of electrical energy; and an annular conductive member attached to the other end of said element and extending longitudinally essentially coaxially within said sheath, said annular conductive member being spaced from the inner surface of said sheath and being adapted for connection to said source of electrical energy.

References Cited

UNITED STATES PATENTS

| 2,396,099 | 3/1946 | Hartwell | 338—208 |
| 2,482,050 | 9/1949 | Yejeski | 338—208 X |

FOREIGN PATENTS 234,239    6/1964    Austria.

LARAMIE E. ASKIN, *Primary Examiner.*

E. GOLDBERG, *Assistant Examiner.*